United States Patent [19]

Lazear

[11] Patent Number: 4,608,673
[45] Date of Patent: Aug. 26, 1986

[54] MINIMUM PHASE BANDPASS FILTERING OF SEISMIC SIGNALS

[75] Inventor: Gregory D. Lazear, Ponca City, Okla.

[73] Assignee: Conoco Inc., Ponca City, Okla.

[21] Appl. No.: 493,502

[22] Filed: May 11, 1983

[51] Int. Cl.$^4$ .............................................. G01V 1/28
[52] U.S. Cl. ...................................... 367/43; 367/38; 367/55; 364/421; 364/724
[58] Field of Search ...................... 367/38, 43, 44, 46, 367/47, 48, 50, 55, 42; 364/421, 724

[56] References Cited

U.S. PATENT DOCUMENTS

| | | | |
|---|---|---|---|
| 3,598,982 | 8/1971 | Lawrence | 367/44 |
| 3,599,175 | 8/1971 | Hollingsworth et al. | 367/42 |
| 3,622,966 | 11/1971 | George et al. | 367/42 |

OTHER PUBLICATIONS

Robinson et al., "Principles of Digital Filtering", Geophysics, vol. 29, #3, 6/64, pp. 395-404.
Smith, "A Review of Methods of Filtering Seismic Data," Geophysics, vol. 23, #1, 1/58, pp. 44-57.

Primary Examiner—Nelson Moskowitz
Assistant Examiner—Ian J. Lobo
Attorney, Agent, or Firm—Charles E. Quarton

[57] ABSTRACT

A process for better defining first break seismic energy travel times for correlated seismic return signals that consists of constructing a minimum phase bandpass filter having bandwidth narrower than the vibrational seismic return signals and convolving the filter with the return signals to convert the seismic return signals to a causal wave form.

9 Claims, 9 Drawing Figures

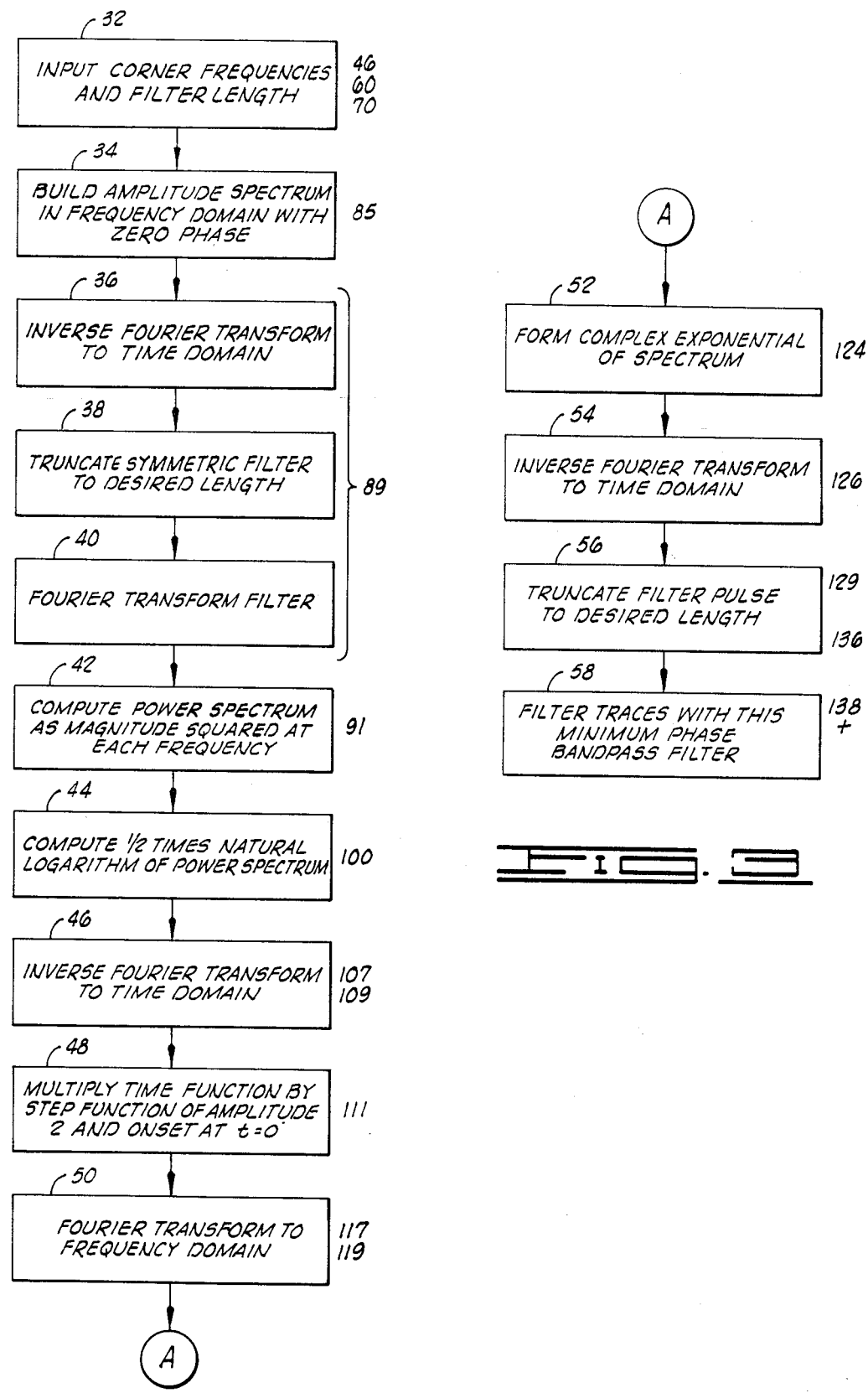

MINIMUM PHASE BANDPASS FILTERING OF SEISMIC SIGNALS

BACKGROUND OF THE INVENTION

1. Field of the Invention

The invention relates generally to a method of filtering correlated seismic signals in order to define the first break with greater accuracy thereby to improve derivation of static correction data and, more particularly, but not by way of limitation, it relates to an improved form of digital filtering for defining travel times of near surface data.

2. Description of the Prior Art

Applicant knows of no prior art that is directed to a method for accurately determining the near surface or refraction signal arrival times on correlated vibrational type seismic data. Current methods involve choosing of an arbitrary position or amplitude on the first positioned vibrational wavelet, i.e. correlated wavelet, or in using only relative time changes from trace to trace rather than attempting to pick the true travel times.

SUMMARY OF THE INVENTION

The present invention relates to an improved method for computer implemented digital filtering for use with correlated vibrational seismic signals wherein filtering with a selected minimum phase bandpass filter effectively transforms the two-sided symmetric first break wavelet to a one-sided causal waveform having the attribute that the exact onset time of first arrival is located at the first point of departure of the return signal trace from the base line. Thus, the process functions to construct a bandpass filter in the frequency domain with zero phase; then to inverse Fourier transform to the time domain and to truncate the zero phase, symmetric filter pulse operator to a specified length; thereafter, a Hilbert transform is performed to obtain minimum phase spectrum for final formation of a filter operator in the time domain having minimum phase for convolution with the seismic traces under consideration.

Therefore, it is an object of the present invention to provide a filtering method for correlated seismic data that more accurately defines the first arrival time of seismic return signals, particularly refracted signals.

It is also an object of the present invention to provide a relatively simple digital filtering method that is readily operative with correlated seismic signals to accurately process refracted return data.

It is still further an object of the present invention to provide a method for establishing accurate first break times of correlated seismic signals despite the presence of correlation side lobes and other arrivals.

Finally, it is an object of the invention to design a digital filter which can change the phase of the vibrational seismic signal wavelet, i.e. as correlated, and alter its amplitude spectrum in such a way that it appears to become a causal wavelet, i.e. uncorrelated.

Other objects and advantages of the invention will be evident from the following detailed description when read in conjunction with the accompanying drawings which illustrate the invention.

BRIEF DESCRIPTION OF THE DRAWINGS

FIG. 2 is a flow diagram illustrating first steps of the process of the present invention;

FIG. 3 is a flow diagram illustrating final steps of the process, including convolution of a seismic trace set;

DETAILED DESCRIPTION

The present invention functions to produce a minimum phase bandpass filter that is effective to alter the time/phase relationship of a two-sided or symmetric type of correlation wave to produce a one-sided type of wave that is causal in appearance. That is, a causal wave similar to the characteristic noncorrelated seismic return wave forms. Thus, in using specific program implemented computer, a filter is designed which can change the phase of the correlated signal wavelet and alter its amplitude spectrum in such a way that it appears to become a causal wavelet. Very simply, this enables more accurate determination of return signal first break as it may be picked at the point of first trace departure from the trace base line. Thus, refracted seismic data travel time can be more accurately determined for static corrections.

As is well known, the vibrational method of seismic exploration involves the transmitting of a sinusoidal sweep of selected frequency range and duration into the earth, and thereafter recording the return signals from specified transducer locations. The sweep signal data is then further defined by crosscorrelating recorded return seismic signals with a replica of the input sweep or control signal. This crosscorrelation process produces a zero phase, two-sided symmetric waveform which has its peak centered at the location of the event. That is, the center of the primary or largest amplitude pulse indicates actual travel time or event location while the entire wavelet proceeds on both sides in equally diminishing side lobes. Thus, if many reflection events are present at the same or near same time, the wavelets can become superimposed in interference with one another, tending to alter or mask over any peak wave form which might be examined for exact time or event location. Thus, as shown in FIG. 1A, a causal waveform as processed without use of crosscorrelation, e.g. return signal from a dynamite source, is illustrated at waveform 10 and it may be readily seen that first break signal travel time may be picked exactly at the point of departure from the base line 12, i.e. point 14 as illustrated by dash-line 16.

Figure 1A:
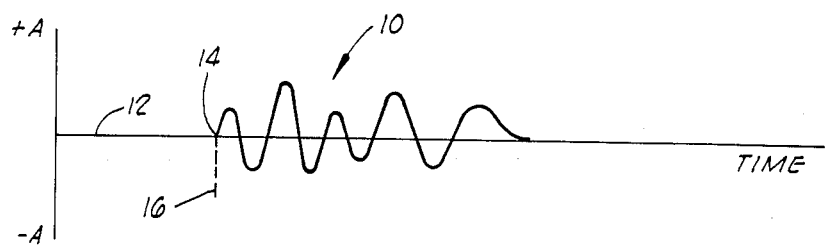
FIG. 1A is a graphic depiction in amplitude versus time of a first arrival portion of seismic signal return from a causal source.
Figure 1B:
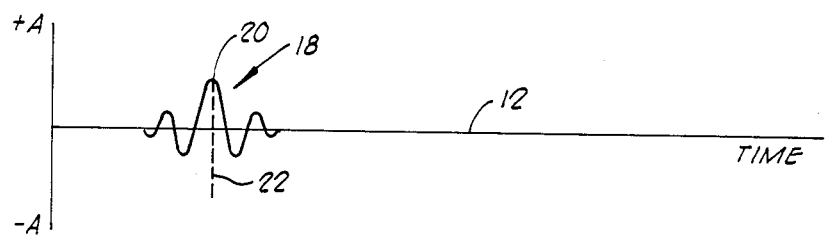
FIG. 1B is a graphic depiction in amplitude versus time of an idealized symmetric seismic signal, as results from the crosscorrelation process.
Figure 1C:
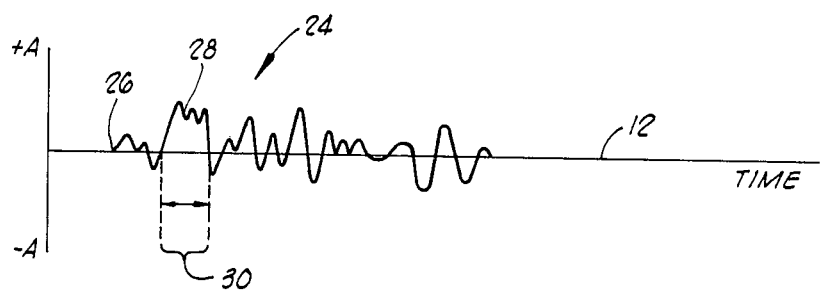
FIG. 1C is a graphic depiction in amplitude versus time of a portion of near surface vibrational seismic signal after correlation.

FIG. 1B illustrates a correlated wavelet 18 as might result from crosscorrelation of vibrational seismic data and in this case the event location or exact wave time is at peak center 20 as illustrated by dash-line 22. Thus, the typical correlation wavelet such as wavelet 18 has the primary center lobe plus a plurality of symmetrically disposed side lobes on each side. In the usual case of seismic signal return, there is not a clear cut signal pulse return but a grouping of plural return pulses which tend to partially overlay and interfere each with the other as far as concise wave form definition is concerned. FIG. 1C illustrates a typical type of first break interference on a seismic trace has been crosscorrelated with control signal to produce the final trace. The seismic trace 24 shows signal on baseline 12 at point 26; however, the actual arrival time for static correction purposes would lie at the center of the peak of the first correlation wavelet, and trace 24 indicates a slurred and indistinct peak 28 showing presence of several first break pulses in close time relationship. Thus, the actual time zero or first break time will fall some place between the dashlines indicated by bracket 30.

In order to more accurately process the profile of seismic traces through later specific enhancement procedures, it is first desirable to derive an exact time relationship for the near surface, from first arrival signals such as might be refracted from the weathering layer and other shallow interfaces. In some cases, the reflectors or refractors lie as a layered medium, and in still other cases the shallow refracting medium may appear in a gradational velocity relationship as where sucessive compaction of earth particles has taken place such that shallow surface wave travel is generally arcuate in propagation and return. Whether the weathering velocity is gradational or exhibits fairly sharp layering, travel times for energy withing this low velocity sector become very critical when processing to develop the static correction times that may then be applied to the overall seismic section data to eliminate the effect of variations in elevation, weathering thickness or velocity.

The present invention processes correlated seismic signals, such as trace 24 of FIG. 1C, to alter the signal in the frequency domain for reconstitution in time domain as a causal-type wavelet, such as trace 10 of FIG. 1A, wherein the first break or first departure from baseline 12 will give a true first arrival time indication. The digital filter which converts the two-sided, symmetric vibrational wavelet to a causal-type one-sided wavelet is a minimum phase bandpass filter in which the bandpass is narrower than the bandwidth of the vibrational seismic wavelets. This digital filtering is effected by the following steps:

(1) Constructing a bandpass filter in the frequency domain having zero phase;

(2) inverse Fourier transforming to the time domain and truncating the zero phase, symmetric filter pulse to a specified operator length, typically 101 points;

(3) performing a Hilbert transform on the logarithm of the amplitude spectrum of the filter pulse to obtain the minimum phase spectrum;

(4) forming a new filter pulse with the same amplitude spectrum but minimum phase; and (5) convolving the minimum phase bandpass wavelet with seismic traces.

This process is illustrated in the flow diagrams of FIGS. 2 and 3 as taken in series. The program list out for the process is enumerated hereinafter, and the numbers to the right of the flow blocks in FIGS. 2 and 3 illustrate the program number for the particular flow step procedure. A first flow stage 32 carries out input-ting of corner frequencies and filter length after initial header information is cleared through the program. Program steps 46 through 83 carry out the input functions in accordance with selected filter attributes as determined from initial considerations of the seismic survey. Thus, initial frequency and final frequency limits will be input in accordance with the original vibrator control signal band width including the on and off tapers. It should be considered, too, that return seismic signal bandwidth may be somewhat narrower than the original control signal bandwidth and this should be taken into consideration when selecting the minimum phase filter parameters. Next flow stage 34 then functions to compute the bandpass filter in accordance with the prior set parameters.

Flow stage 36 performs inverse Fourier transform on the filter data to convert the data to the time domain, i.e. time is the independent variable upon which operation may be made. The time domain data is then processed in flow stage 38 to truncate the symmetric filter to a desired operator length. Thus, the time domain length of the impulse response in the nature of a convolution operator may be specified by a certain number of points, typically 101 points, which has specific relationship to the seismic date sampling rate and number of sampling intervals. Flow stage 40 then functions to Fourier transform the filter operator back to the frequency domain.

Flow stage 42 then functions to process the frequency domain data to compute the power spectrum as the magnitude squared at each frequency. The power spectrum is the square of the amplitude-frequency response, i.e. the Fourier cosine transform of the autocorrelation function. Thereafter, stage 44 computes one half times the natural logarithm of the power spectrum and flow stage 46 again inverse Fourier transforms the data to the time domain. Flow stage 48 then multiplies the time function by a step function selected to be of amplitude 2 and onset at $t=0$. This data is again Fourier transformed in stage 50 to the frequency domain, where frequency is the independent variable.

Referring to FIG. 3, the data is operated on in stage 52 to form a complex exponential of the frequency spectrum and this data is inverse Fourier transformed to the time domain in stage 54 and truncated in stage 56 to establish a digital filter pulse or filter operator of desired length for the particular seismic section undergoing processing. Thereafter, flow stage 58 inputs all traces of the section for processing with the minimum phase bandpass filter operator to convert the crosscorrelated seismic trace data to data having causal attributes wherein event time may be accurately picked. Given this output as to seismic energy travel time, the data can be further processed to establish static corrections for the trace data through various subsequent data enhancement processes.

The basic computer program performing the process of the present invention may be written in Fortran 5 language for operation on such as a Control Data Corporation computer commercially available as CYBER model 760. It should also be understood that the program process of the invention is fully compatible with hybrid computer applications utilizing relatively simple microprocessor circuitry. Such selection of hardware and requisite variances in program are well within the skill of the artisan.

A full listout for the minimum phase bandpass filter is as follows:

```
1      PROGRAM MPF (INPUT,OUTPUT,TAPE5=INPUT,TAPE6=OUTPUT)
2  C
3  C  ****************************************************************
4  C
5  C  MINIMUM PHASE BANDPASS FILTER
6  C  WRITTEN BY GREGORY D. LAZEAR , PROJECTS GROUP, 5/14/82
7  C
8  C  PROGRAM COMPUTES A BANDPASS FILTER.AND THEN CONVERTS THE PULSE
9  C  INTO A MINIMUM PHASE (CAUSAL) PULSE.  THIS FILTER WILL PRESERVE
10 C  CAUSALITY AND MINIMUM PHASE SO COULD BE USED ON REFRACTION FIRST
11 C  ARRIVALS OR BEFORE DECONVOLUTION TO SAVE PASSBAND WITH OPTIMUM
12 C  S/N RATIO.
13 C
14 C  NPV = NUMBER OF FILTER PULSE VALUES
15 C  IF1 = INITIAL FREQUENCY AT START OF TAPER (AMPL = 0)
16 C  IF2 = INITIAL FREQUENCY AT END OF TAPER (AMPL = 1)
17 C  FF1 = FINAL FREQUENCY AT START OF TAPER (AMPL = 1)
18 C  FF2 = FINAL FREQUENCY AT END OF TAPER (AMPL = 0)
19 C
20 C  ****************************************************************
21 C
22         COMMON/ECS/ECAR
23         LEVEL 3,/ECS/
24         COMPLEX SPEC (4096)
25         DIMENSION ECAR (6000)
26         DIMENSION TR(5000), LTA(6), WORK(8192), SCR(5000)
27         DIMENSION HDR(5032), IHDR(32), NAME(10), FMT(10)
28         DIMENSION FTR(5000), FHDR(5032), IFHDR(32), MCBF(200)
29 C
```

```
30      EQUIVALENCE (SPEC(1),WORK(1)), (FHDR(1),IFHDR(1)), (FHDR(33),FTR(1
31      +))
32      EQUIVALENCE (HDR(33), TR(1)), (HDR(1), IHDR(1))
33 C
34      COMMON/ARGL/ NPV,SF1,SF2,FF1,FF2
35 C
36      DATA NAME/"NPV","IF1","IF2","FF1","FF2",5*"         "/
37      DATA FMT/"(I,4F)   ",9*"         "/
38 C
39 C
40      CALL M2OWD(TR)
41      CALL GETG(2,1,DT)
42      CALL GETG(5,1,NT)
43      CALL ASNBR(1900,*900)
44      CALL ASNBR(1901,*901)
45 C
46 C    DEFAULT PARAMETERS
47 C
48      IDIM=4096
49      NHW=32
50      NPV=101
51      SF1=3.0
52      SF2=7.0
53      FF1=50.0
54      FF2=60.0
55      IFW=-1
56      INV=1
57 C
58      CALL DCODE(FMT,NAME,5,NPV)
```

```
59  C
60  C    CHECK INPUT PARAMETERS
61  C
62          IFLG=0
63          IF(SF1.GT.SF2) IFLG=1
64          IF(SF2.FE.FF1) IFLG=1
65          IF(FF1.GT.FF2) IFLG=1
66          IF(IFLG.EQ.0) GO TO 10
67          WRITE (6,2000)
68          CALL EXEXIT(1)
69  C
70  C    SET TRANSFORM SIZE AND CONSTANTS
71  C
72     10   NP2=4096
73          NPH2=NP2/2
74          NYQ2=NPH2 + 1
75          LTA(1)=NPV
76          LTA(2)=NT
77          LTA(3)=NT
78          LTA(4)=0
79          LTA(5)=1
80          LTA(6)=1
81          ISTK=0
82          IxSF=0
83          IER=0
84  C
85  C    COMPUTE BANDPASS FILTER
86  C
```

```
 87        INP=1
 88        PH=0.0
 89        CALL BPFLT(SCR,NPV,WORK,DT,SF1,SF2,FF1,FF2,PH,INP)
 90 C
 91 C  COMPUTE POWER SPECTRUM OF FILTER PULSE
 92 C
 93        CALL CLEAR (WORK,IDIM*2)
 94        CALL MOVE (SCR,WORK,NPV)
 95        CALL RFFT(WORK,NP2,-1,SCR)
 96 C
 97        DO 200 I=1,NYQ2
 98    200 SPEC(I)= SPEC(I) * CONJG(SPEC(1))
 99 C
100 C  FORM 1/2 LOG(POWER SPECTRUM)
101 C
102        DO 130 I=1,NYQ2
103    130 SPEC(I)=CMPLX(0.5 * ALOG(WORK(2*I-1)), 0.0)
104        DO 30 I=2,NPH2
105     30 SPEC(NP2-I+2)= SPEC(I)
106 C
107 C  GO TO TIME DOMAIN - HILBERT TRANSFORM
108 C
109        CALL FOUR1(SPEC,NP2,INV)
110 C
111 C  MULTIPLY BY UNIT STEP OF AMPLITUDE 2
112 C
113        DO 140 I=2,NPH2
114        SPEC(I)=CMPLX(2.0*REAL(SPEC(I)) ,0.0)
115    140 SPEC(NP2-I+2)=CMPLX(0.0)
```

```
116 C

117 C    BACK TO FREQUENCY DOMAIN

118 C

119         CALL FOUR1(SPEC,NP2,IFW)

120         DO 20 I=1,NYQ2

121         SPEC(I)=SPEC(I)/FLOAT(NP2)

122  20     CONTINUE

123 C

124 C    FORM COMPLEX EXPONENTIAL

125 C

126         DO 150 I=1,NYQ2

127  150    SPEC(I)=CEXP(SPEC(I))

128 C

129 C    TRUNCATE FILTER TO NPV IN LENGTH

130 C

131         CALL RFSN(WORK,NP2,1,SCR)

132         CALL CLEAR(WORK(NPV+1(, 2*IDIM-NPV)

133         WRITE(6,2001) (WORK(I), I=1,NPV)

134  2001   FORMAT(/,10(2X,F10.6))

135 C

136 C    WORK NOW CONTAINS MINIMUM PHASE FILTER

137 C

138 C    INPUT TRACES AND FILTER

139 C

140         N=0

141         NN=0

142         TRMAX=0.0

143  100    N=N+1

144         CALL CLEAR(FTR,NT)
```

```
145           CALL CLEAR(TR,NT)
146           CALL TRIN(HDR,N,O,I900,I901)
147           IF(HDR(11).NE.0.0) GO TO 50
148           CALL MOVE(HDR,FHDR,NT+NHW)
149           GO TO 160
150      50   CALL MCNVLUT(WORK,TR,FTR,LTA,ISTK,IXSF,ECAR,MCBF,IER)
151           IF(IER.NE.0) PRINT *,'*** FILTER ERROR ON TRACE ',N
152  C
153  C   OUTPUT FILTERED TRACE TO SYSTEM
154  C
155     160   NN=NN+1
156           CALL MOVE(IHDR,IFHDR,NHW)
157           CALL SETMAX(FTR,2,NT,FHDR(11))
158           IF(FHDR(11).GT.TRMAX) TRMAX= FHDR(11)
159           CALL TROT(FHDR,NN,0,I901)
160           GO TO 100
161  C
162     900   PRINT *,'***** TRIN ERROR ON TRACE',N,' PROCESS TERMINATED'
163     901   PRINT *,'TRACES IN = ',N-1,'  TRACES OUT = ',NN
164  C
165           CALL RHFILE(SCR)
166           SCR(62)=TRMAX
167           CALL WHFILE(SCR)
168           CALL TREND
169           CALL EXEXIT
170  C
171  C
WARNING* NUMBER OF ARGUMENTS IN REFERENCE TO _EXEXIT IS NOT CONSISTENT
172    2000  FORMAT(/,5X,'* * ERROR IN BANDPASS SPECIFICATIONS * *',/)
```

173   C

174       END

—VARIABLE MAP—(LO=M/A/R)

-NAME----ADDRESS---BLOCK------PROPERTIES--------TYPE----------SIZE---

| NAME | ADDRESS | BLOCK | PROPERTIES | TYPE | SIZE |
|------|---------|-------|------------|------|------|
| DT | 56462B | | | REAL | |
| ECAR | 0B | /ECS/ | LEV3 | REAL | 6000 |
| FF1 | 3B | /ARGL/ | | REAL | |
| FF2 | 4B | /ARGL/ | | REAL | |
| FHDR | 24612B | | EQV | REAL | 5032 |
| FMT | 12420B | | | REAL | 10 |
| FTR | 246528 | | EQV | REAL | 5000 |
| HDR | 12742B | | EQV | REAL | 5032 |
| I | 56503B | | | INTEGER | |
| IDIM | 56566B | | | INTEGER | |
| IER | 56500B | | | INTEGER | |
| IFHDR | 24612B | | EQV | INTEGER | 32 |
| IFLG | 56472B | | | INTEGER | |
| IFW | 56470B | | | INTEGER | |
| IHDR | 12742B | | EQV | INTEGER | 32 |
| INP | 56501B | | | INTEGER | |
| INV | 56471B | | | INTEGER | |
| ISTK | 56476B | | | INTEGER | |
| IXSF | 56477B | | | INTEGER | |
| 1900 | 56464B | | | INTEGER | |
| 1901 | 56465B | | | INTEGER | |
| LTA | 570B | | | INTEGER | 6 |
| MCBF | 12432B | | | INTEGER | 200 |

| | | | | | | |
|---|---|---|---|---|---|---|
| N | 56506B | | | INTEGER | | |
| NAME | 12406B | | | INTEGER | 10 | |
| NHW | 564678 | | | INTEGER | | |
| NN | 56507B | | | INTEGER | | |
| NPH2 | 56474B | | | INTEGER | | |
| NPV | 0B | /ARGL/ | | INTEGER | | |
| NP2 | 56473B | | | INTEGER | | |
| NT | 56463B | | | INTEGER | | |
| NYQ2 | 56475B | | | INTEGER | | |
| PH | 56502B | | | REAL | | |
| SCR | 576B | | | REAL | 5000 | |
| SF1 | 1B | /ARGL/ | | REAL | | |
| SF2 | 2B | /ARGL/ | | REAL | | |
| SPEC | 36462B | | EQV | COMPLEX | 4096 | |
| TR | 13002B | | EQV | REAL | 5000 | |
| TRMAX | 56510B | | | REAL | | |
| WORK | 36462B | | EQV | REAL | 8192 | |

---PROCEDURES---(LO=M/A/R)

-NAME------TYPE-------ARGS-----CLASS------REFERENCES-

| | | | | | | | |
|---|---|---|---|---|---|---|---|
| ALOG | REAL | 1 | INTRINSIC | 103/A | | | |
| ASNBR | | 2 | SUBROUTINE | 43 | 44 | | |
| BPFLT | | 10 | SUBROUTINE | 89 | | | |
| CEXP | COMPLEX | 1 | INTRINSIC | 127 | | | |
| CLEAR | | 2 | SUBROUTINE | 93 | 132 | 144 | 145 |
| COMPX | GENERIC | 2 | INTRINSIC | 103 | 114 | 115 | |

| | | | | | | |
|---|---|---|---|---|---|---|
| CONJG | COMPLEX | 1 | INTRINSIC | 98 | | |
| DCODE | | 4 | SUBROUTINE | 58 | | |
| EXEXIT | | 1 | SUBROUTINE | 68 | 169 | |
| FLOAT | REAL | 1 | INTRINSIC | 121 | | |
| FOURI | | 3 | SUBROUTINE | 109 | 119 | |
| GETG | | 3 | SUBROUTINE | 41 | 42 | |
| MCNVLUT | | 9 | SUBROUTINE | 150 | | |
| MOVE | | 3 | SUBROUTINE | 94 | 148 | 156 |
| M20WD | | 1 | SUBROUTINE | 40 | | |
| REAL | GENERIC | 1 | INTRINSIC | 114/A | | |
| RFFT | | 4 | SUBROUTINE | 95 | | |
| RFSN | | 4 | SUBROUTINE | 131 | | |
| RHFILE | | 1 | SUBROUTINE | 165 | | |
| SETMAX | | 4 | SUBROUTINE | 157 | | |
| TREND | | 0 | SUBROUTINE | 168 | | |
| TRIN | | 5 | SUBROUTINE | 146 | | |
| TROT | | 4 | SUBROUTINE | 159 | | |
| WHFILE | | 1 | SUBROUTINE | 167 | | |

--STATEMENT LABELS--(LO=M/A/R)

-LABEL--ADDRESS----PROPERTIES------DEF---REFERENCES-

| LABEL | ADDRESS | PROPERTIES | DEF | REFERENCES |
|---|---|---|---|---|
| 10 | 76B | DO-TERM | 72 | 66 |
| 20 | INACTIVE | DO-TERM | 122 | 120/D |
| 30 | INACTIVE | DO-TERM | 105 | 104/D |
| 50 | 266B | | 150 | 147 |
| 100 | 251B | | 143 | 160 |
| 130 | INACTIVE | DO-TERM | 103 | 102/D |
| 140 | INACTIVE | DO-TERM | 115 | 113/D |
| 150 | INACTIVE | DO-TERM | 127 | 126/D |

| | | | | |
|---|---|---|---|---|
| 160 | 273B | | 155 | 149 |
| 200 | INACTIVE | DO-TERM | 98 | 97/D |
| 900 | 306B | | 162 | 43 |
| 901 | 310B | | 163 | 44 |
| 2000 | 362B | FORMAT | 172 | 67/W |
| 2001 | 357B | FORMAT | 134 | 133/W |

--ENTRY POINTS--(LO=M/A/R)

-NAME----ADDRESS---ARGS-------REFERENCES-

| | | | |
|---|---|---|---|
| MPF | 178 | 0 | 1/D |

1 WARNING ERROR IN MPF

The result of applying a minimum phase bandpass filter to a zero phase wavelet may be illustrated by means of computer printouts drawn in accordance with the present invention.

Figure 4A:
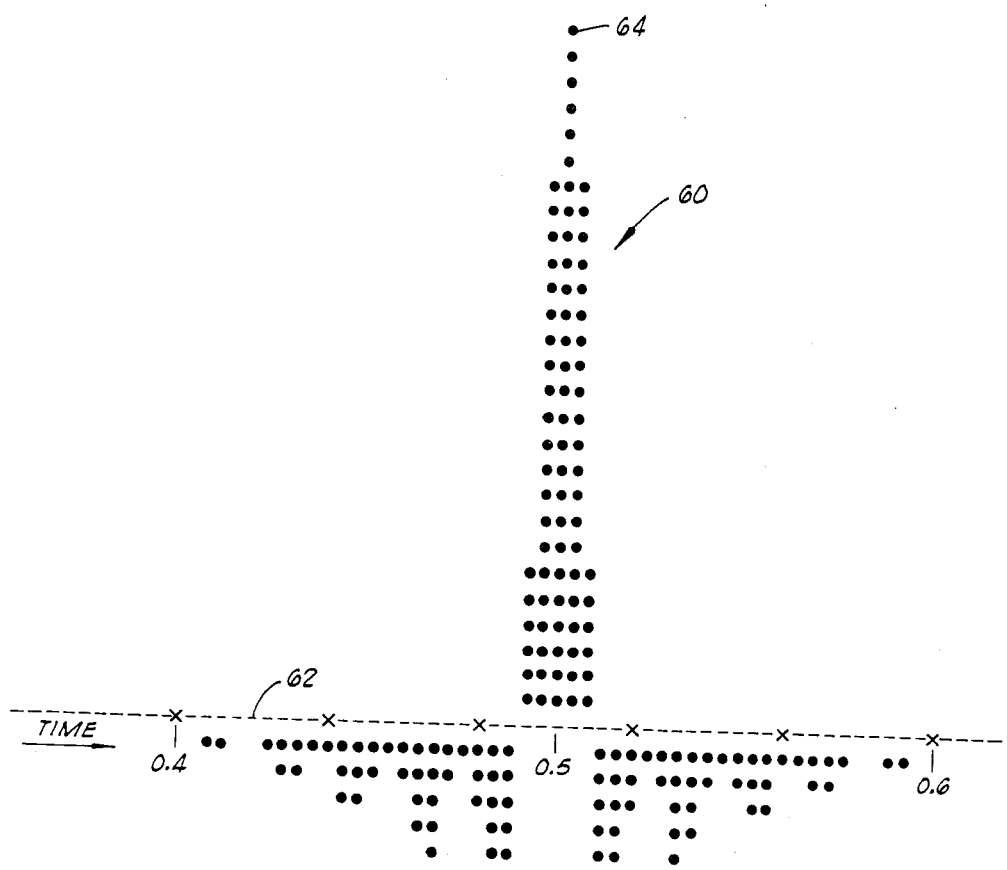
FIG. 4A is a computer printout of a typical correlated seismic wavelet.
Figure 4B:
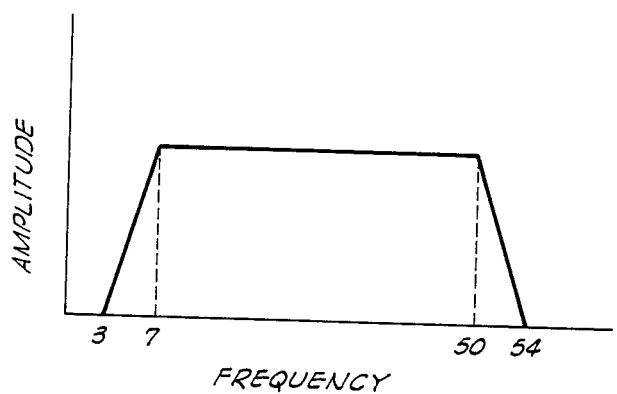
FIG. 4B is an amplitude spectrum for the wavelet illustrated in FIG. 4A.

FIG. 4A illustrates graphically a zero phase wavelet having an amplitude spectrum such as shown in FIG. 4B. The amplitude spectrum tapers on from three to seven cycles, maintains a unit value from seven to fifty cycles, and tapers off from fifty to fifty-four cycles. A printout of a zero phase wavelet dictated by such amplitude spectrum is indicated by wavelet 60 of FIG. 4A. Wavelet 60 is printed out on a baseline 62 representative of time and the event time for wavelet 60 is indicated as 0.5 seconds, the center most position of symmetrical wave peak 64.

Figure 5A:
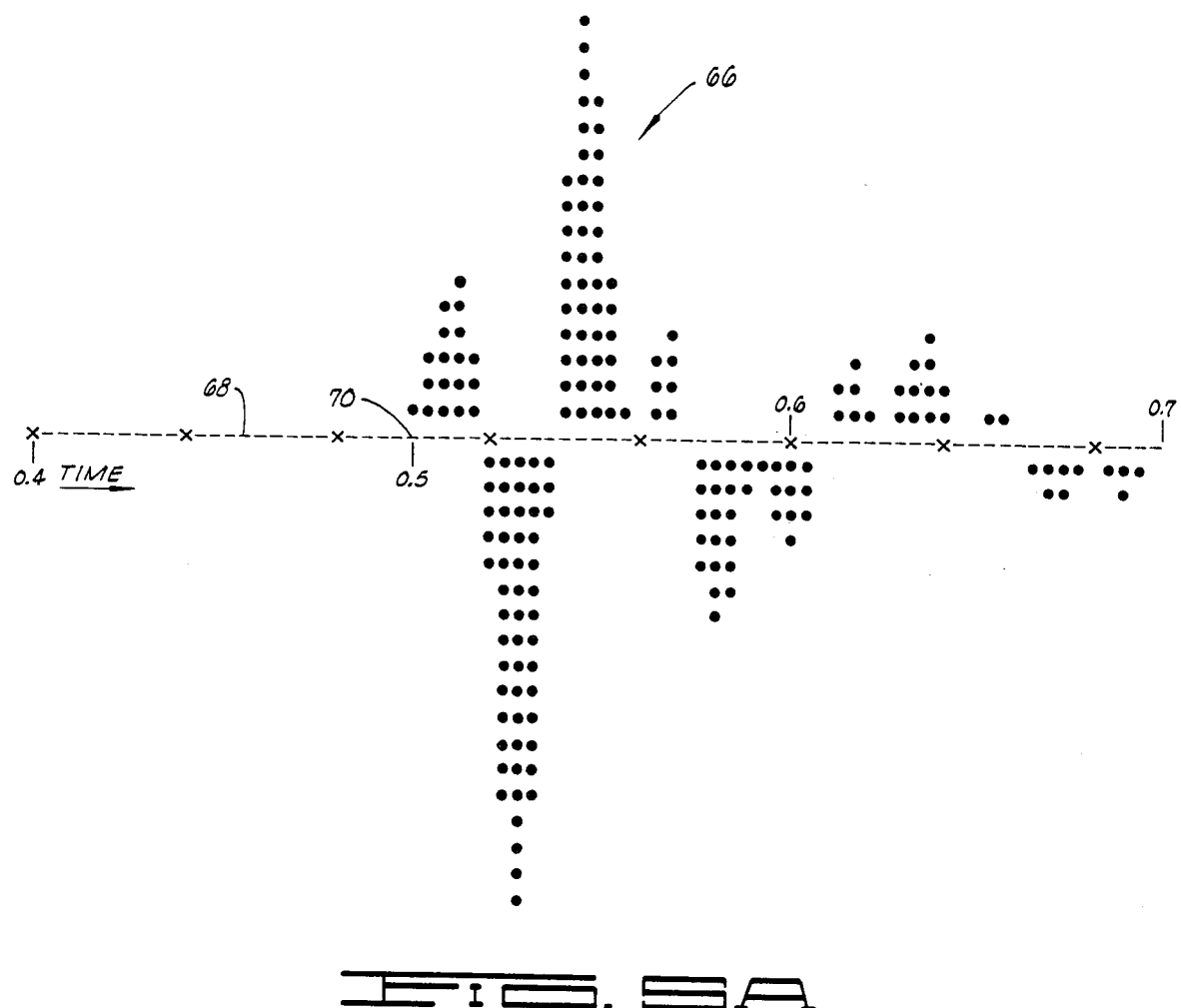
FIG. 5A is a computer printout of a causal wavelet resulting from application of the method of the invention to the correlated wavelet of FIG. 4A.
Figure 5B:
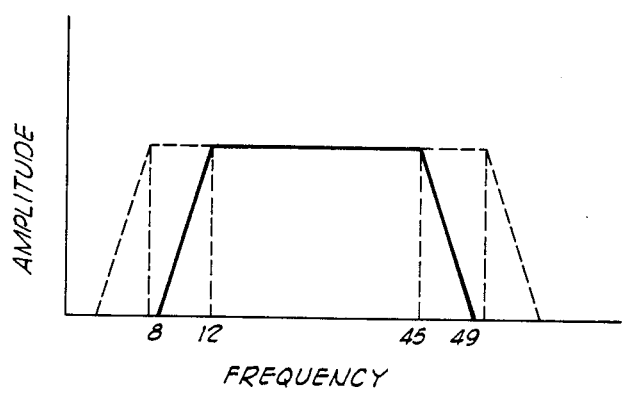
FIG. 5B is an adjusted amplitude spectrum making up the minimum phase filter that produced the causal waveform of FIG. 5A.

As shown in FIGS. 5A and 5B, a similar type of computer printout illustrates that a casual-type wave 66 results from application of a minimum phase filter operator constructed from an amplitude spectrum such as that shown in FIG. 5B. Thus, the amplitude spectrum outlines a narrower bandwidth of taper on from eight cycles to twelve cycles, unit amplitude from twelve to forty-five cycles, and taper off from forty-five to forty-nine cycles. Computer printout of the filtered casual wave 66 indicates that the first breakpoint from the baseline 68 is now at 0.50 seconds which is the same as the event indication for the symmetrical wavelet of FIG. 4A. Thus, location of the event has been shifted to the onset of the wavelet in casual form.

The foregoing discloses a novel method utilizing a digital filter and selected minimum phase operator for converting vibrational seismic signal refraction arrivals into a casual form so that the first break or onset of the refraction arrival may be accurately determined. Such accurate time determinations are valuable for use in subsequent processing to compute the static corrections for the particular set of reflection data along whatever the selected survey site. The invention relies on the discovery that the minimum phase bandpass filter has the capability of effecting the necessary changes in the wave form thereby to produce a casual appearance, and it should be understood that the process may be variously effected by equivalent hardware and program implementation.

Changes may be made in combination and arrangement of elements as heretofore set forth in the specification and shown in the drawing; it being understood that changes may be made in the embodiments disclosed without departing from the spirit and scope of the invention as defined in the following claims.

The embodiments of the invention in which an exclusive property or privilege is claimed are defined as follows:

1. A method of filtering crosscorrelated seismic data comprising:
   constructing a selected bandpass filter operator in the frequency domain having zero phase;
   transforming said bandpass filter operator and obtaining a minimum phase spectrum, and forming a frequency domain filter operator with the same amplitude spectrum but minimum phase;
   again transforming said frequency domain filter operator to the time domain to form said minimum phase bandpass filter operator; and
   convolving said minimum phase bandpass filter operator with said crosscorrelated seismic data to define the data first arrival time.

2. A method as set forth in claim 1 wherein said step of transforming comprises:
   inverse Fourier transforming said bandpass filter operator to the time domain and truncating to obtain a zero phase, symmetric filter operator of selected length; and
   transforming the logarithm of the amplitude spectrum of the symmetric filter operator to obtain the minimum phase frequency domain filter operator.

3. A method as set forth in claim 1 wherein said step of again transforming includes:
   an inverse Fourier transform of said frequency domain filter operator.

4. A method as set forth in claim 2 wherein said step of again transforming includes:
an inverse Fourier transform of said frequency domain filter operator.

5. A method as set forth in claim 1 wherein said step of transforming comprises:
inverse Fourier transforming said bandpass filter operator to the time domain and truncating to produce a zero phase filter operator; and
computing one-half times the natural logarithm of the power spectrum of the zero phase filter operator and performing a Hilbert transform to produce said minimum phase frequency domain filter operator.

6. A method as set forth in claim 5 wherein said step of again transforming comprises:
forming the complex exponential of the power spectrum; and
inverse Fourier transforming to the time domain and truncating to selected operator length to produce said minimum phase bandpass filter operator for convolution with said crosscorrelated seismic data.

7. A method as set forth in claim 1 wherein said step of transforming comprises:
inverse Fourier transforming said bandpass filter operator to the time domain and truncating to obtain a zero phase, symmetric filter operator of selected length;
Fourier transforming said symmetric filter operator to the frequency domain and computing the power spectrum as the magnitude squared at each frequency;
computing one-half times the natural logarithm of the power spectrum;
inverse Fourier transforming said power spectrum logarithm to the time domain and multiplying by a step function of selected amplitude two and onset at time equals zero; and
Fourier transforming said multiplied time function.

8. A method as set forth in claim 2 wherein said step of again transforming comprises:
forming the complex exponential of the logarithm of the power spectrum of the minimum phase frequency domain filter operator; and
inverse Fourier transforming to the time domain and truncating to selected operator length to produce said minimum phase bandpass filter operator for convolution with said crosscorrelated seismic data.

9. A method as set forth in claim 7 wherein said step of again tansforming comprises:
forming the complex exponential of the logarithm of the power spectrum of the frequency domain filter operator; and
inverse Fourier transforming to the time domain and truncating to selected operator length to produce said minimum phase bandpass filter operator for convolution with said crosscorrelated seismic data.

* * * * *